United States Patent [19]

Talas

[11] Patent Number: 4,693,283
[45] Date of Patent: Sep. 15, 1987

[54] PROCESS FOR CONTINUOUSLY DISPENSING LIQUID MICROBICIDES INTO METALWORKING FLUIDS

[75] Inventor: Eva E. Talas, Ontario, Canada

[73] Assignee: Pennwalt Corporation, Philadelphia, Pa.

[21] Appl. No.: 881,376

[22] Filed: Jul. 2, 1986

Related U.S. Application Data

[63] Continuation-in-part of Ser. No. 683,076, Dec. 19, 1984, abandoned.

[51] Int. Cl.⁴ .............................................. B67D 5/00
[52] U.S. Cl. ........................................ 141/1; 222/23; 422/256
[58] Field of Search ............... 4/222, 227, 496; 141/1, 141/12, 67, 69, 70, 85, 94, 97, 110, 311 R; 222/1, 23, 160, 389, 630; 422/256, 265

[56] References Cited

U.S. PATENT DOCUMENTS

| | | | |
|---|---|---|---|
| 2,148,180 | 2/1939 | Teigen | 422/265 |
| 2,934,409 | 4/1960 | Biehl | 4/222 X |
| 3,202,322 | 8/1965 | Cleary et al. | 422/265 X |
| 3,430,731 | 3/1969 | Satzinger | 184/39 |
| 4,023,648 | 5/1977 | Orlitzky et al. | 338/77 X |

Primary Examiner—Henry J. Recla
Assistant Examiner—Mark J. Thronson

[57] ABSTRACT

Processes for continuously dispensing liquid microbicides at extremely low rates into metalworking fluids over predetermined periods for control of microbial activity therein comprising dropping a dispensing device filled with the microbicide into a sump containing a fluid. The filled dispenser sinks to the bottom of the sump and rises to the surface of the fluid as the microbicide in the dispenser approaches depletion whereupon a filled dispenser may again be charged into the sump.

5 Claims, 5 Drawing Figures

PROCESS FOR CONTINUOUSLY DISPENSING LIQUID MICROBICIDES INTO METALWORKING FLUIDS

This application is a continuation-in-part of copending application of the same title, Ser. No. 683,076, filed Dec. 19, 1984, now abandoned, of Eva E. Talas, assigned to the assignee hereof.

STATEMENT OF THE INVENTION

The present invention relates to processes for automatically continuously dispensing a first fluid into a second fluid, and more particularly to the dispensing of a microbicide at very low rates into industrial fluids, such as metalworking fluids, for example, to preserve the fluids by controlling bacteria and fungi dispersed therein.

BACKGROUND AND SUMMARY OF THE INVENTION

Fluids such as water emulsifiable and water soluble metalworking lubricants are subject to attack by bacteria, fungi, yeasts, molds, and other microbes which tend to destroy the fluid's active ingredients and degrade the performance of the fluid.

In order to control such microbial attack, it is necessary to add a microbicide to the fluid.

Heretofore, such microbicides were added manually, by "tea-bag" type packets, or by gravity-activated devices.

In a manual application, the microbicide fluid is merely poured into the sump containing the metalworking fluid or lubricant at certain intervals, from about once a week to about once a month, depending upon the severity of the attack, in doses not exceeding about 0.02% by volume of the fluid. Since the microbicide is corrosive and contact therewith usually causes severe skin burns and eye damage, extreme handling precautions are necessary. Furthermore, an operator would often forget to add the microbicide to the fluid at the prescribed time intervals resulting in a rancid and foul-smelling fluid as well as a loss of metalworking effectiveness. Failure to add microbicide to the sumps due to annual plant shut-down, although only a once-year occurrence, is a problem recognized by the industry.

In the "tea-bag" packet type application, the microbicide is a dustless solid absorbed on an inert carrier and placed in a semi-permeable membrane packet which may then be suspended into the metalworking fluid like a "tea-bag". Such packets are generally safely handled, but gradually lose their effectiveness after being immersed in the fluid for several days due to the initial rapid leaching out of the microbicide, and hence become progressively less effective with the passage of time.

In "gravity-activated" devices, the liquid microbicide is permitted to drop or slowly flow into the sump containing the lubricant fluid, much like a liquid drips or flows from intravenous equipment. Since the microbicide additions are made at very low rates, dust and foreign material oftentimes cause interruption or cessation of the fluid flow. Further, a container of liquid microbicide hanging above a sump represents a continuous potential hazard to those in proximity to the container.

To overcome the abovementioned deficiencies of the prior art, I have found that the liquid microbicide may be added to a commercially available dispensing device which automatically continuously dispenses its contents at a controlled rate. The dispenser, now filled with the fluid microbicide, is simply dropped into a sump containing the metalworking fluid to be treated or preserved. The filled dispenser sinks to the bottom of the sump. As the dispenser slowly controllably feeds microbicide therefrom over a predetermined period of time, the dispenser slowly rises to the surface to float thereon as the microbicide therein approaches exhaustion or depletion. The empty or near-empty dispenser may then be retrieved for subsequent usage or discarded.

The dispenser may comprise a battery powered, electrochemical cell which, when activated, generates a gas to cause a diaphragm enclosing the cell to expand which urges a piston member in contact with the liquid microbicide to expel it through an outlet provided in the dispenser.

The rate of flow of the microbicide from the dispenser is normally controlled by the volume of gas formed by the electrochemical cell, which gas volume is dependent upon the amount of current applied to the cell. The current applied to the cell may readily be controlled by placing a resistor of desired value between the battery and cell, or, one of several resistors of varying resistance values may be selected to provide an assortment of volumes of gases to be generated.

The dispensing device used in the processes of the present invention may suitably comprise "Electro-Lube", manufactured by A.T.S. Electro-Lube Ltd. of 11-7550 River Road, Tilbury Industrial Park, Delta, British Columbia, Canada, and covered by U.S. Pat. No. 4,023,648, incorporated herein by reference. However, in order to facilitate an understanding of the present invention, pertinent portions of the specification and drawings are reproduced or modified herein.

The invention, of course, is not intended to be limited to the use of the abovementioned patented dispenser, since any suitable dispenser capable of continuously dispensing its contents may be adapted for use with the present inventive processes.

DETAILED DESCRIPTION OF THE DISPENSER

Figure 1:
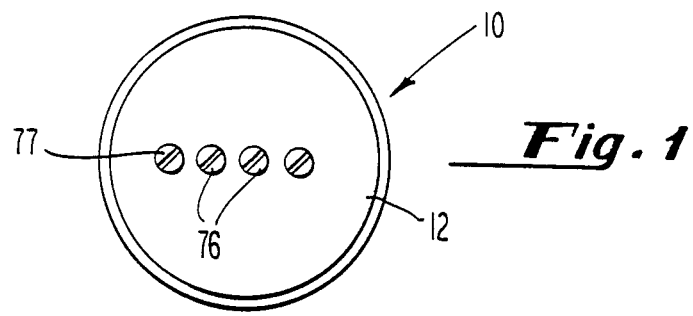
FIG. 1 is a plan view of an embodiment of the dispenser usable in the processes of the present invention.

Industrial cutting and grinding fluids are typically water emulsifiable oils or water soluble synthetic or semi-synthetic fluids. These metalworking fluids are disposed in a tank or sump, and are normally constantly recirculated between the sump and the machine. The sump's capacity is usually 500 gallons, or less, typically rectangular in shape, and up to about 5 feet in depth. As mentioned above, these fluids become foul-smelling and progressively ineffective if microbial activity therein is not properly controlled.

In FIGS. 1 through 5, the numeral 10 designates a dispenser device suitable for dispensing microbicides into these metalworking fluids.

Dispenser 10 includes container 12 which may be made from any suitable material such as steel, for example. Container 12 is provided with a funnel-shaped bottom 15 having an axial passageway 16 therethrough which increases in diameter to form an enlarged passageway 18 at a lowermost portion of the funnel-shaped bottom.

A transparent inner sleeve 22 is provided within container 12. The liquid microbicide 24 is contained within sleeve 22. Container 12 is provided with a plurality of vertically arranged sight ports 40 to permit viewing the amount of microbicide within the sleeve. A short length of plastic tubing 25, typically about 6 inches, is firmly secured within enlarged passageway 18 by clamping or bolt means (not shown). Outer end 26 of tube 25 is sealed by heat, pressure, and the like. Outer end 26 will be removed, of course, prior to activation of dispenser 10.

Dispenser 10, when empty, i.e., when sleeve 22 contains no microbicide 22 therein, will float upon the surface of metalworking fluids. When sleeve 22 however is filled with a liquid microbicide, such, for example, as the commercially available microbicides typically employed in the present invention, i.e., typically 10% of 5-chloro-2-methyl-4-isothiazolin-3-one, and 3.4% of 2-methyl-4-isothiazolin-3-one, balance comprising other ingredients such as magnesium chloride and magnesium nitrate, among others, the resultant mixture having a specific gravity or density of approximately 1.25, the filled dispenser cannot be supported on the surface of the metalworking fluid (having a typical specific gravity slightly less than that of water) and hence the dispenser sinks to the bottom of the sump.

Activation of dispenser 10 prior to dropping it into the sump is later described.

Referring again to FIG. 2 of the drawings, a head 27 is mounted within container 12 at the end thereof remote from bottom 15. Head 27 is shaped to accommodate sleeve 22, as shown at 28. A separator is movably mounted in the container for movement towards outlet passage 18 and divides the container into a microbicide chamber 29 and a gas chamber 29a. This separator includes means for preventing gas from moving from gas chamber 29a, to microbicide chamber 19. In this example, the separator includes a gas-proof diphragm 30 extending across the bottom of head 27, and having a skirt 31 which fits over the side of the head and is fixedly secured between the latter and sleeve 22, which is pressed against said skirt firmly to hold the diaphragm in position. The separator preferably also includes a piston 35 in the container, said piston having an annular wall 36 projecting upwardly therefrom and slidably fitting inside sleeve 22. Sealing means, such as O-rings 38, is provided around wall 36 between it and sleeve 22. These rings slide against the inner surface of the sleeve to keep piston 35 from tipping within the sleeve. It will be noted that when the container is full of microbicide, piston wall 36 fits up into the space 28 between sleeve 22 and skirt 31 of diaphragm 30.

Figure 3:
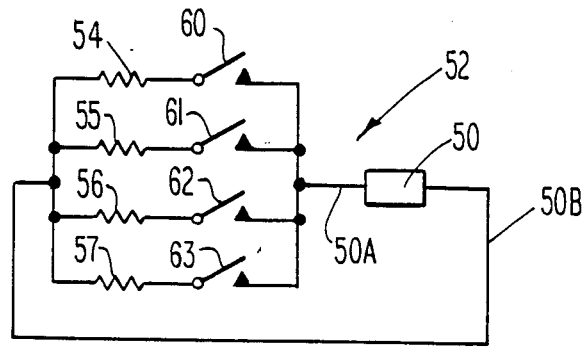
FIG. 3 is a diagrammatic illustration of the electrical system of the dispenser of FIG. 2.

Gas chamber 29a includes a reduced chamber 44 formed in head 27 and opening downwardly towards diaphragm 30. A perforated plate 45 is provided at an upper portion of chamber 44, and is maintained thereat by a snap ring 46. Electrical current and gas generating means in the form of a cell 50 is disposed in chamber 44 and rests on perforated plate 45. Cell 50 forms a portion of the electrical system 52 of the dispenser (FIG. 3). Circuit 52 comprises a plurality of resistors connected in parallel across the circuit, each resistor being in series with a switch. In this example, there are four resistors 54, 55, 56 and 57 respectively in series with switches 60, 61, 62, and 63. Each resistor is connected in the circuit when it respective switch is closed. These resistors have different resistance values which increase progressively as resistor 57 is approached.

Switches 60 to 63 are in the form of internally threaded sockets 68, 69, 70 and 71, respectively. In this example, the socket of each switch forms one contact, and additional contacts 72, 73, 74 and 75 are provided at the bottoms of and insulated from the respective sockets. The sockets are adapted to receive threaded plugs or screws, and when the dispenser is not in use, a plug or screw 76 formed of non-electrically conducting material is threaded into each socket. Although these screws are not absolutely necessary, they keep dirt out of the sockets and prevent the circuits from being accidentally closed. At least one screw or plug 77 formed of electrically conducting material is provided for use when the dispenser is to be put into operation. When this screw is in one of the sockets, it engages the two contacts of said socket to close the switch formed thereby. It is appreciated that the threading of plugs 76 or 77 into their respective sockets forms a completely watertight union thereat.

Figure 2:
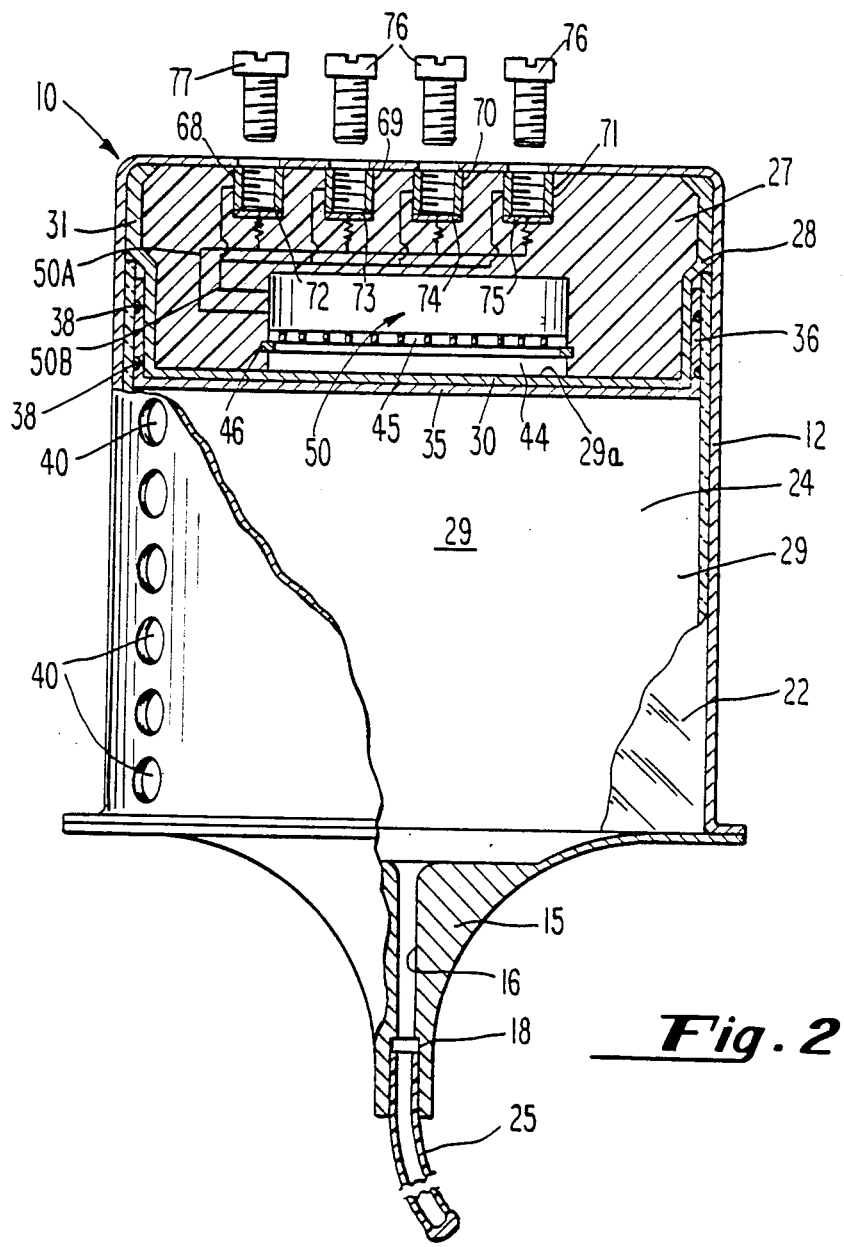
FIG. 2 is a vertical sectional view of the dispenser of FIG. 1, part in perspective and part broken away, with the electrical wiring diagrammatically illustrated.

As shown in FIGS. 2 and 3, parallel disposed switches 60–63 may be individually closed to form a closed circuit with cell 50 through conductors 50A and 50B.

Figure 4:
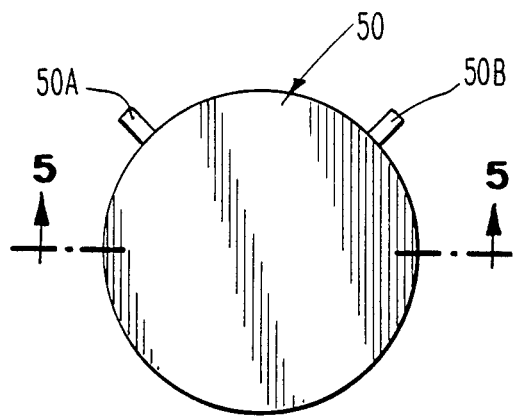
FIG. 4 is an enlarged plan view of the power cell for the dispener.
Figure 5:
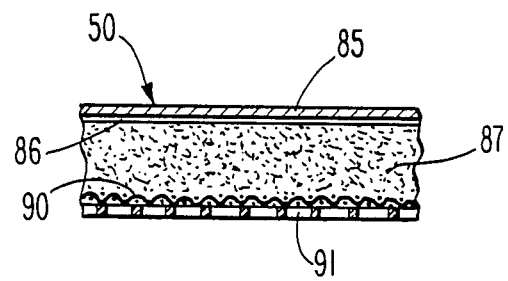
FIG. 5 is a sectional view of FIG. 4 taken along line 5—5 thereof.

Cell 50 is illustrated in detail in FIGS. 4 and 5. Cell 50 is in the form of a sandwich, and includes an anode 85 formed of zinc metal or some other metal or alloy which is electro-chemically suitable for this purpose. An absorbant insulating layer 86 formed of paper or cotton is provided inside the anode. Layer 86 is impregnated with an electrolyte located in a relatively thick layer 87 of plastic made of carbon black or other similar material mixed with the electrolyte. The electrolyte consists, for example, of a mixture of a strong solution of lithium chloride in water (about 40% lithium chloride) with enough zinc chloride, usually about 10%, to bring the pH below about 6. The respective amounts of carbon and electrolyte can be something of the order of 15 to 25% carbon and 80–75% by weight electrolyte. Beneath paste layer 87 is a cathode 90 in the form of a fine mesh metal screen, such as, for example, 100 mesh stainless steel, lead or similar material. A sheet 91, typically a 12 mesh polypropylene screen, for example, forms the bottom of cell 50.

In use, outer end 26 of tubing 25 is removed. Conducting plug 77 is screwed into one of the sockets 68–71, depending upon the duration of continuous feeding of microbicide 24 desired. Thus, the circuit which includes resistor 54 of a lower resistance may provide continuous feeding of the microbicide for a period of 30 days, for example, while a resistor 57 of higher resistance may provide continuous dispensing of the microbicide up to about 12 months. Of course, more than one electrically conducting screwed plug may be turned to provide a flow rate greater than the flow rate resulting from the turning of any one thereof, and other resistor elements may be substituted or added to provide specific or desired flow rates over a predetermined period of time.

Turning one of the screwed plugs does not, of course, cause the microbicide to be expelled immediately since time is required to generate a sufficient amount of gas to urge diaphragm 30 and piston 35 down chamber 29.

The dispenser chamber 29 containing the liquid microbicide 24 measures about 2⅛" in diameter by about 1¼" in height, and it is thus readily apparent that the continuous dispensing of the microbicide into the metalworking fluid takes place at an extremely slow rate.

The following table recites a sequence of events relating to an experimental test made at a nearby metalworking plant showing the effectiveness of continuously dispensing a microbicide into metalworking fluid in accordance with the processes of the present invention. Bacteria count for two samples taken is presented as "colonies per ml of solution" while metalworking fluid concentration is shown as a percentage.

TABLE I

TEST OF EFFECTIVENESS OF CONTINUOUS DISPENSING OF MICROBICIDE INTO METALWORKING FLUID IN ACCORDANCE WITH PROCESSES OF PRESENT INVENTION

| DAY | EVENT | RESULTS |
|---|---|---|
| 1 | Grinder (100 ga. capacity)-semi-synthetic fluid charged to 3% concentration | |
| 14 | Fluid concentration | 2.8% |
|  | Bacteria count | $10^5$ & $10^5$ |
| 17 | Dispenser filled with liquid (5-chloro-2 methyl-4 isothiazolin-3-one) and dropped into sump | |
| 21 | Lab sample concentration of fluid | 2.4% |
|  | Bacteria count | $10^5$ & $10^5$ |
| 27 | Bacteria count | $10^3$ & $10^3$ |
| 34 | Lab sample concentration of fluid | 3.3% |
|  | Bacteria count | 0 & $10^3$ |
| 42 | Bacteria count Dispenser was observed starting to surface | 0 and 2 colonies |
| 43 | Dispenser surfaced to float on fluid - substantially empty | |
| 57 | Lab sample concentration of fluid | 3.6% |
|  | Bacteria count | $10^3$ & $10^4$ |

Dispenser 10 was set to continuously dispense about 100 cc (volume of dispenser chamber 29) of microbicide 24 over a period of 30 days, although the microbicide was substantially exhausted after about 26 days. The grinder operators were unaware that the metalworking fluid was being treated. They complained of no skin eruptions during the test. There was a complete absence of rancid odor of the fluid after about ½ of the microbicide had been expelled into the fluid. Product quality remained excellent throughout the test period.

Temperature gradients within the metalworking fluid, or the temperature of the fluid itself under normal operating conditions, or a sump containing the fluid located at high elevations, have negligible effect on the operation of the dispenser when used in accordance with the processes of the present invention.

As aforediscussed, the processes of the present invention may be used advantageously with other dispensers. For example, when the device shown and described in U.S. Pat. No. 3,430,731 is used, also incorporated herein by reference (designed to continuously supply lubricant to machine bearings), gas initiating means are activated in order to position a galvanic element into contact with an electrolyte to cause gas to be generated which expands a diaphragm member to thereby expel the lubricant from an outlet provided in the lubricator device. The lubricator device may have the outlet adapted to receive a short length of plastic tubing 25, for example, also having an inside diameter of approximately 1/16" as in the present device for convenient feeding of the liquid microbicide into the metalworking fluid.

The lubricator device covered by U.S. Pat. No. 3,430,731, may be provided with a small metal weight or hollowed article, if necessary, to insure the necessary submersion and surfacing of the device in accordance with the processes of the present invention. The extent to which the metal weight or hollowed article will promote sinking or surfacing respectively of the device may readily be calculated, or determined by simple trial and error techniques.

The present dispenser may be provided with means for transmitting intermittent "blip" lights while activated, and optionally with visible and/or audible signals after surfacing.

It is apparent from the above description that I have provided improved methods or processes for continuously dispensing a liquid microbicide into metalworking fluids at extremely low rates for predetermined and, if desired, for continuous prolonged periods of time. The dispensing device, when devoid of liquid microbicide therein, is caused to float upon the surface of the fluid. When the dispenser contains slight amount of the microbicide in its chamber, the dispenser is yet caused to sink to the bottom of the sump holding the fluid. Regardless of the respective specific gravities of the fluid and microbicide, and the range of temperatures experienced by the fluids under normal operating conditions, the dispenser may be caused to rise to the surface when the microbicide therein is depleted or nearly so. The dispenser may intermittently transmit visible light signals so long as the dispenser is activated. Optionally, visible and/or audible signals may be generated by the activated dispenser when it surfaces in order that the sump may be charged with a filled dispenser to avoid any prolonged interruption of microbicide protection.

I claim:

1. Process for dispensing a first fluid into a contained second fluid from a dispensing device capable of continuously dispensing said first fluid therefrom, said dispensing device having an internal cavity adapted to receive said first fluid and an activatable cell operatively associated with said cavity for generating and supplying gas at a controlled rate to said cavity to dispense said first fluid from said cavity through an associated passageway, comprising the steps of (a) adding said first fluid to the internal cavity of said dispensing device, activating the gas generating cell of said dispensing device to cause said first fluid added to said dispensing device to be continuously dispensed therefrom while so activated after an initial delay corresponding to the time required for the cell to generate sufficient gas to cause said first fluid to be dispensed;

(b) dropping said activated cell and said first fluid containing dispensing device into said contained second fluid for submergence therewithin, said first fluid being dispensed from said dispensing device while so submerged, said first fluid containing dispensing device and the activated associated cell having a weight per volume sufficient to cause the device and cell to sink in the second fluid and to float on the surface after dispensing the first fluid; and (c) allowing said submerged dispensing device to rise to the surface of said contained second fluid after said first fluid is dispensed from said dispensing device.

2. Process of claim 1 wherein said fluid is dispensed from said dispensing device at a controlled rate for a predetermined period of time.

3. Process of claim 1 wherein said contained second fluid is contained within a sump and said submerged dispensing device rests at the bottom of said sump during step (b).

4. Process of claim 1 wherein said first fluid is a liquid microbicide and said contained second fluid is a metalworking fluid.

5. Process of claim 4 wherein said metalworking fluid is a water emulsifiable oil or water soluble synthetic or semi-synthetic fluid.

* * * * *